B. S. AIKMAN.
MECHANISM FOR UNLOADING COMPRESSORS FOR STARTING.
APPLICATION FILED DEC. 6, 1913.
1,230,834.
Patented June 26, 1917.
4 SHEETS—SHEET 3.
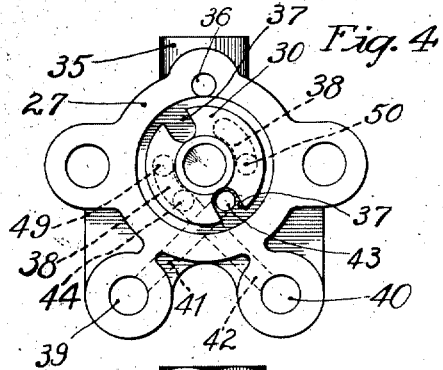
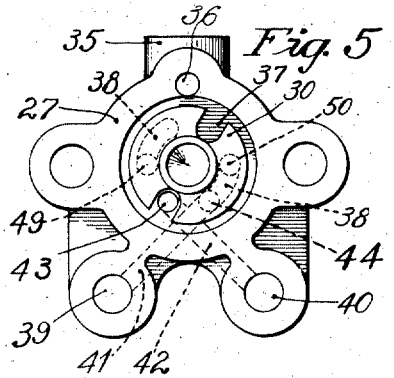
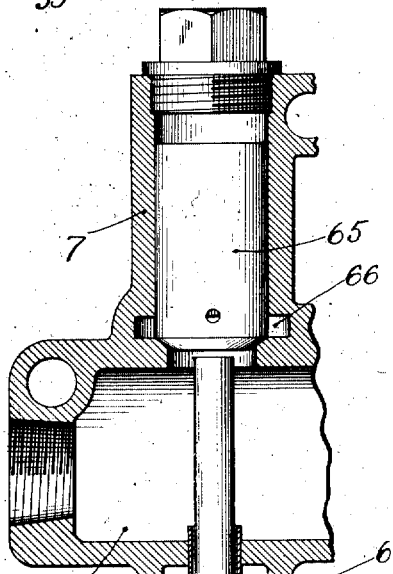
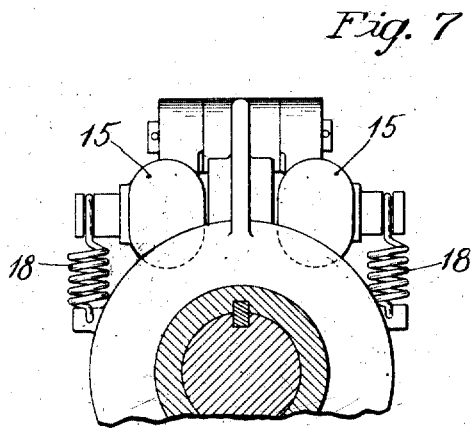
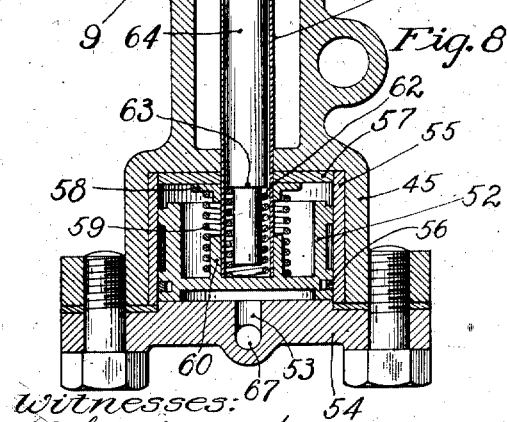
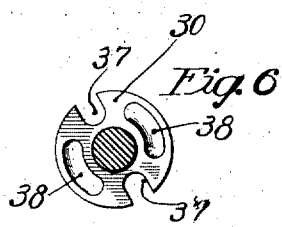
Witnesses:
Robert F. Bracke
Cameron A. Whitsett
Inventor
Burton S. Aikman
By Brown Williams Bell Hanson & Boettcher
Attorneys

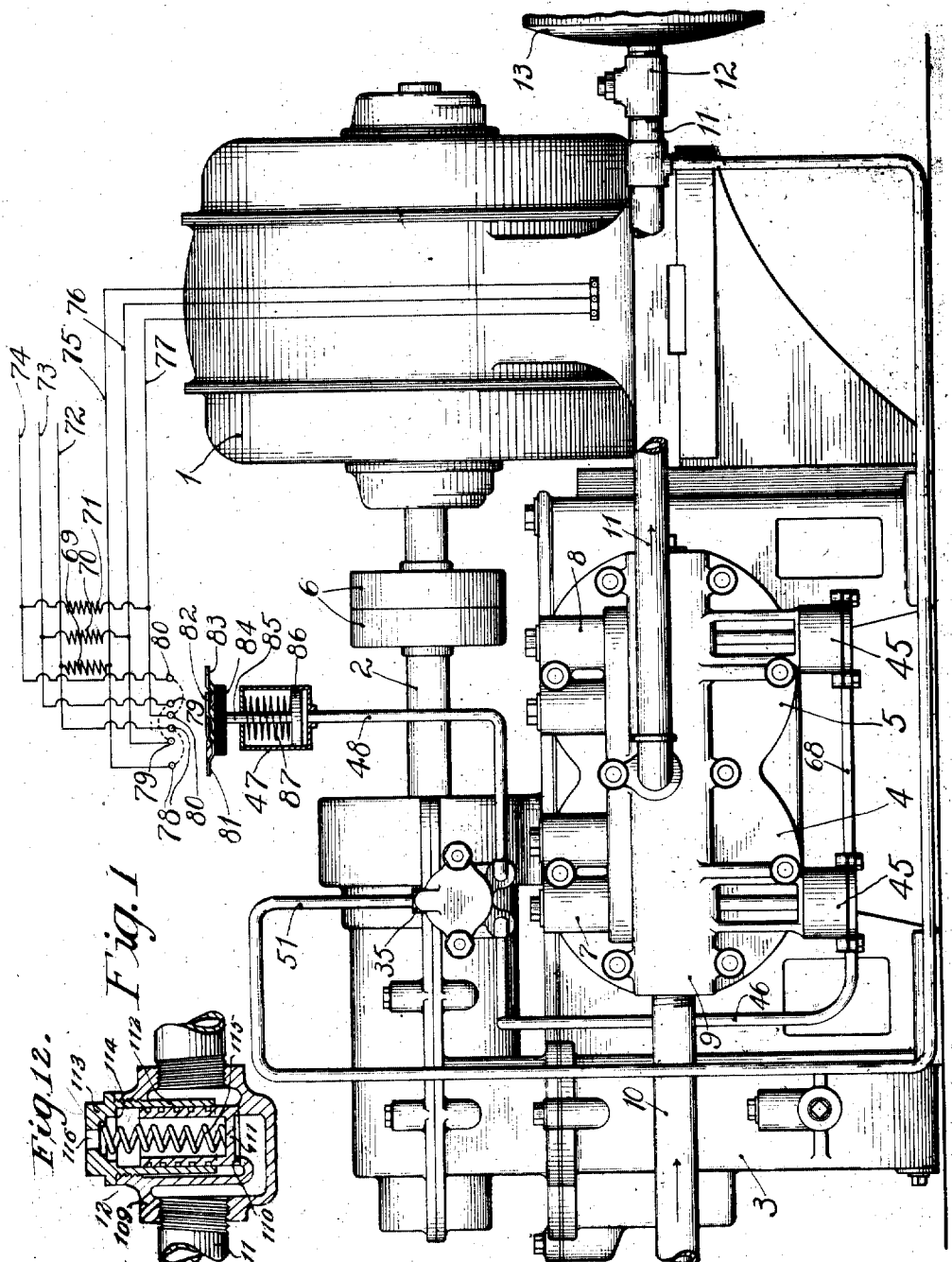

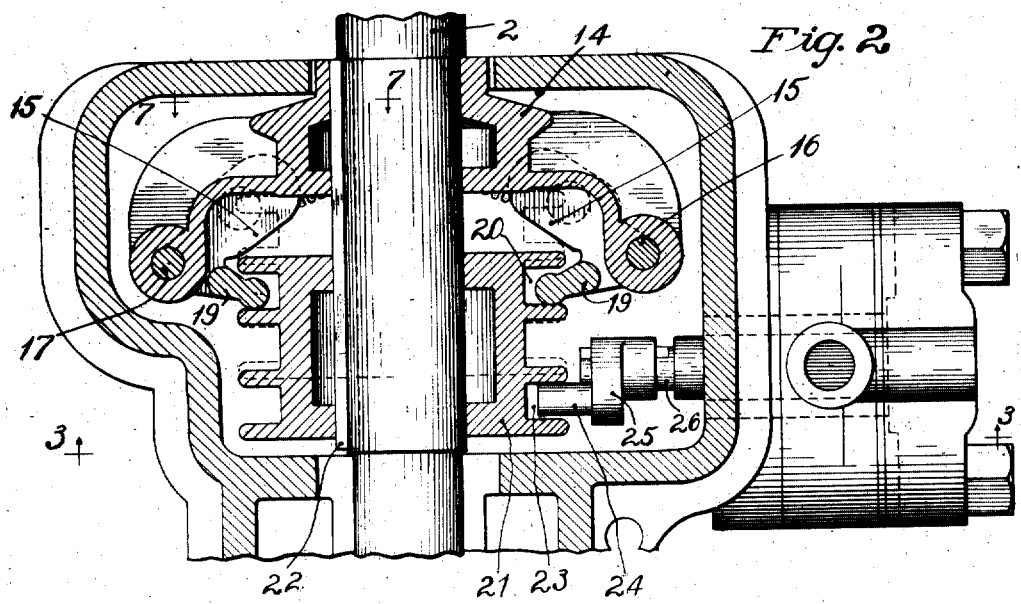
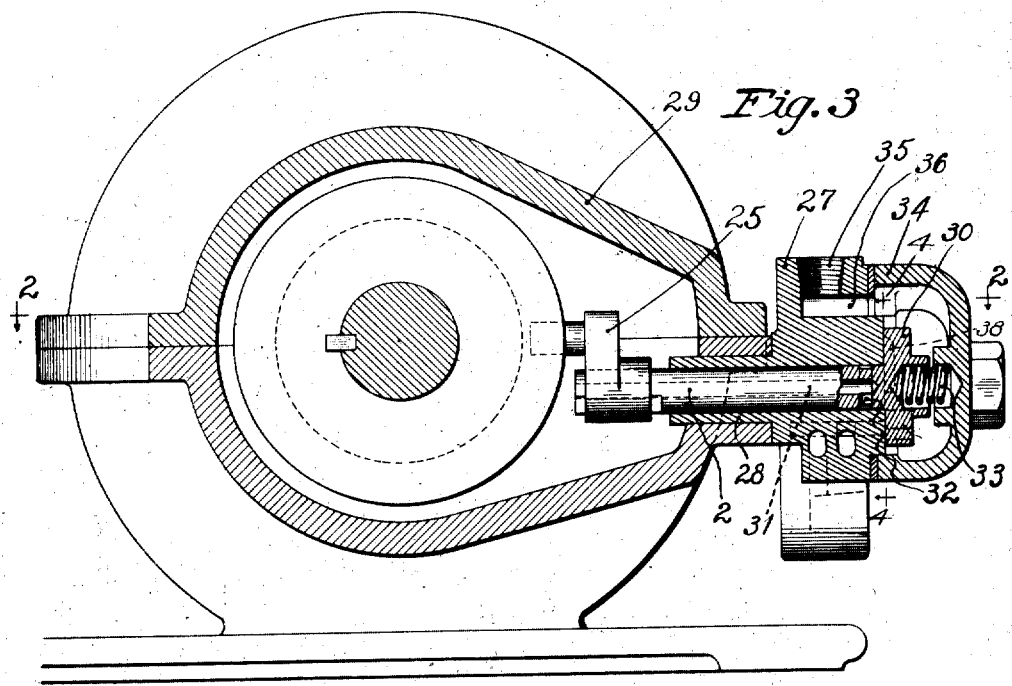

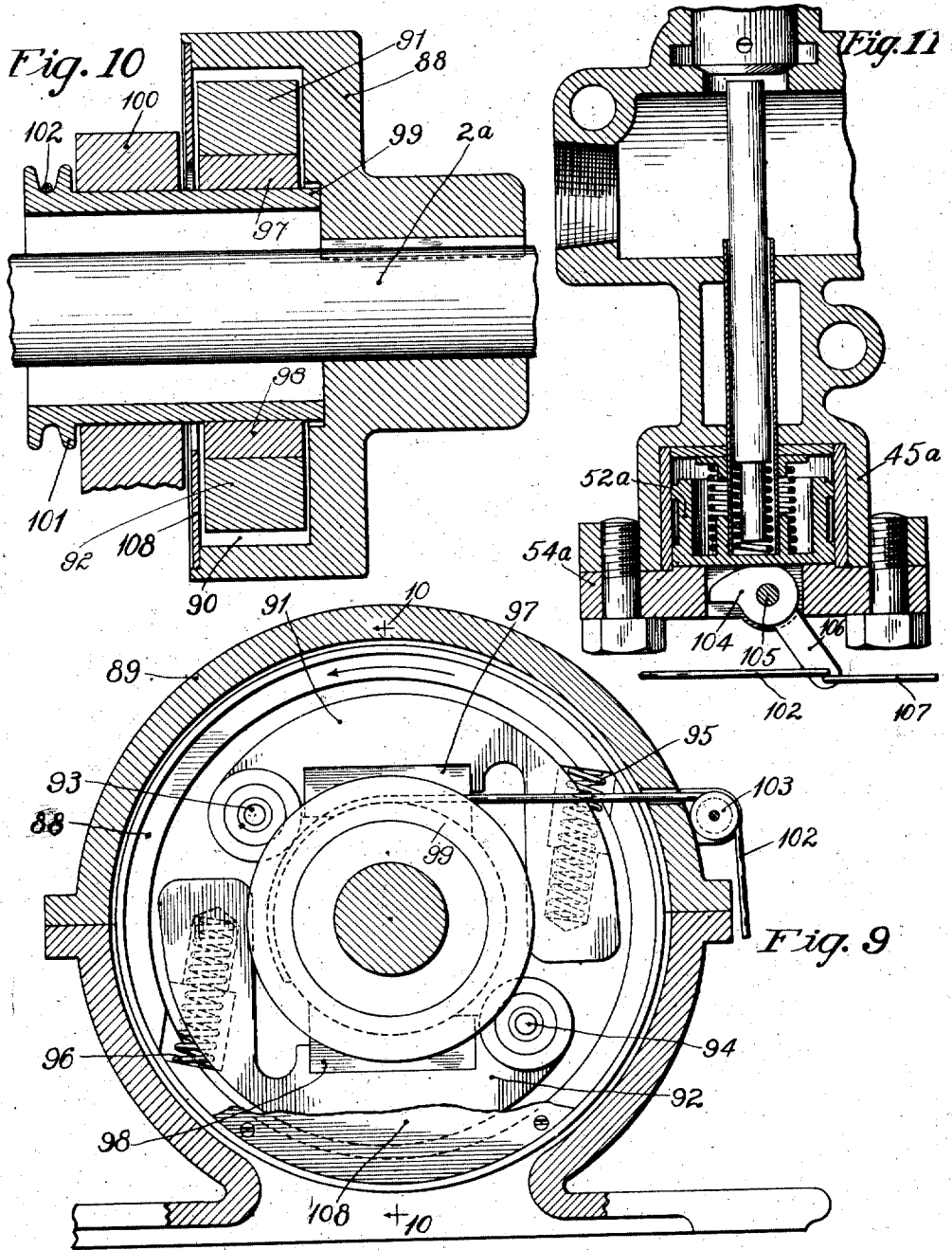

UNITED STATES PATENT OFFICE.

BURTON S. AIKMAN, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

MECHANISM FOR UNLOADING COMPRESSORS FOR STARTING.

1,230,834.     Specification of Letters Patent.     Patented June 26, 1917.

Application filed December 6, 1913. Serial No. 804,959.

*To all whom it may concern:*

Be it known that I, BURTON S. AIKMAN, a citizen of the United States, residing at Milwaukee, in the county of Milwaukee and State of Wisconsin, have invented a certain new and useful Improvement in Mechanism for Unloading Compressors for Starting, of which the following is a full, clear, concise, and exact description, reference being had to the accompanying drawings, forming a part of this specification.

My invention relates to an improved form of controlling mechanism for motors used in connection with air compressors by which the load upon the motor is automatically removed during the starting of the motor so that the motor may be brought nearly or quite to its full-speed before the load of the compressor is placed upon it. In carrying out my invention, I make use of pneumatic control mechanism by which the valves of the compressor are operated so as to prevent the effective operation of the compressor, which pneumatic devices are under the control of valve mechanism actuated automatically by centrifugal means operated by the motor. Thus, although the compressor is mechanically connected with the motor during the starting operation, it does not impose anything but a frictional load upon the motor during the starting operation, as the compression in the compressor is relieved during the starting operation.

My invention is particularly applicable to electric motors of types having low starting torques, as, for example, induction motors, although it is not limited necessarily to use in connection with this particular style of motor.

By my invention I also control, by means of the pneumatic devices referred to, switching mechanism which will electrically control the circuits of the motor so that suitable starting resistances may be employed for starting the motor, which are automatically cut out of circuit or short-circuited when the motor has nearly or quite reached full speed so as to operate the pneumatic devices. It will be understood that the centrifugal mechanism and the devices actuated thereby, whether pneumatic or mechanical, for controlling the operation of the compressor, may be adjusted to operate when the motor has reached any desired speed, whether this speed be full speed or not, and that in practice this speed will be taken of a value corresponding to that at which the motor has built up a sufficient driving torque to carry the load of the compressor.

My invention consists broadly in means actuated by the centrifugal mechanism referred to by which the valves of the compressor are controlled so as to relieve or unload the compressor during the starting of the motor provided for driving the compressor, while in the preferred form of my invention the controlling means for thus unloading the compressor consists of valves and compressed air connections for actuating the compressor valve to secure the results referred to.

While my invention is particularly applicable to air compressors, it will be understood that I do not limit myself to this application as the controlling mechanism shown and described herein is applicable to compressors generally, regardless of the particular kind of fluid that they are intended to compress or pump.

The several drawings illustrating my invention are as follows:

Figure 1 shows in side elevation an electric motor, an air compressor driven therefrom, and my pneumatic controlling mechanism for unloading or relieving the compressor during the starting operation of the motor.

Fig. 2 is a sectional view of the centrifugal mechanism driven by the motor taken on a horizontal plane through the center of the motor shaft, taken along the line 2—2 of Fig. 3.

Fig. 3 is a view of the parts shown in Fig. 2 taken along the line 3—3.

Fig. 4 is a sectional view of the parts shown in Fig. 3 taken along the line 4—4.

Fig. 5 shows in a view similar to Fig. 4 the valve shown in Fig. 4 in its alternate position.

Fig. 6 is a detail view of the valve shown in Figs. 4 and 5.

Fig. 7 is a view of the governing mechanism shown in Fig. 2 taken along the line 7—7.

Fig. 8 is a vertical sectional view taken through one of the suction valves of the compressor shown in Fig. 1 along a plane parallel with the motor shaft and shows the devices employed for pneumatically holding the suction valve from its seat to prevent placing a load upon the compressor.

Fig. 9 shows in a vertical sectional view, taken at right angles to the motor shaft a modified construction of centrifugal controlling means by which the compressor valves are controlled mechanically.

Fig. 10 is a vertical sectional view of the parts shown in Fig. 9, taken along the line 10—10.

Fig. 11 is a view similar to Fig. 8, showing the application of the mechanical controlling means to the valves of the compressor for relieving or unloading the same.

Fig. 12 is a cross sectional view of the loaded valve in the delivery main.

Similar numerals refer to similar parts throughout the several views.

As shown in Fig. 1, the motor 1, which is an electric induction motor, drives a shaft 2 which, by means of gearing contained in the housing 3, operates by means of a crank shaft and cranks the pistons in the compressor cylinders 4 and 5 in a manner well-known in the art. The motor is indicated as connected with the shaft 2 by means of a coupling 6. Each of the cylinders 4 and 5 is provided with a reciprocating piston, as is usual in devices of this kind, and the suction valves 7 and 8 of the cylinders 4 and 5, respectively, receive their air supply from a chamber 9 in communication with the supply pipe 10. The air, after it is compressed in the cylinders 4 and 5, is delivered to the pipe 11 by which it is conducted through the check valve 12 to the storage tank 13.

As indicated in Figs. 2 and 3, the shaft 2 has rigidly secured to it a double bracket 14, to the opposite ends of which the centrifugal weights 15, indicated in Fig. 7, are pivoted at 16 and 17. These weights are provided with springs 18, holding them normally toward the shaft 2 and determining the amount of their outward motion under the action of the centrifugal force due to the rotation of the shaft 2. For convenience, two weights 15 are provided at each end of the bracket 14, one upon either side of said bracket, as this arrangement enables the mechanism to be contained in a smaller housing than would otherwise be the case. The two weights upon each end of the bracket 14 are connected together inside of the bracket by a web 19 having an inwardly projecting rounded edge to engage the groove 20 formed in the sliding collar 21 mounted upon the shaft 2. This sliding collar is prevented from rotating upon the shaft 2 by means of a feather 22 upon which the collar fits loosely so that motion of the collar longitudinally of the shaft is freely permitted. A second groove 23 formed in the collar engages a pin 24 carried by the outer end of a short crank 25, which is secured to the inner end of the shaft 26 used to operate the valve for controlling the pneumatic devices used to unload the compressor. The end of the shaft 26 is flattened upon opposite sides to engage corresponding flats in the bore of the crank 25 so that the latter may be secured in proper angular position upon the shaft 26 without special adjustment and, furthermore, it is immaterial in which of the two positions the crank 25 is placed upon the end of the shaft 26 as the two flats are parallel and of equal extent. This construction is used to facilitate the assembling of the apparatus.

The shaft 26 is supported in a valve casing 27 having a tubular portion 28 tightly fitting into a corresponding opening in the side of the casing 29 inclosing the governor mechanism. The right-hand end of the shaft 26, as shown in Figs. 2 and 3, has a disk 30 formed on it resting against a flat face formed within the valve casing 27 and, by means of openings and ports in and through the disk 30 and in the casing 27, the rotation of the disk 30 by means of the shaft 2 is made to control the valve mechanism connected with the suction valves of the compressor in a manner to be described. It will be noted that the sleeve 28 extends through the casing 29 before the parting line of said casing, so that the sleeve and parts carried thereby are not disturbed by the removal of the cap of the casing 29 to inspect the parts when desired. The shaft 26 has extending through it the bore 31 terminating at its inner end in holes 32 for the purpose of leading oil from the inside of the casing 29 to the inner end of the surface of the shaft 2 and also to the surface between the disk 30 and the valve casing 27. A spring 33 is provided between the cap 34 of the valve casing and the disk 30 to hold it firmly against its seat. The casing 29 preferably contains a quantity of oil to be engaged by the bracket 14 and the governor balls 15 as they rotate so that the parts contained within the casings 27 and 29 will be thoroughly lubricated at all times.

The valve casing 27 is provided with a pipe connection 35 for supplying air under pressure to the valve and the air thus supplied is communicated through a port 36 to the outer surface of the disk 30, thus serving in part to hold the disk against its seat. As shown in Figs. 4 and 5, the disk 30 has two diametrically opposite slots 37 formed through it and two diametrically opposite ports 38 formed on its inner or valve surface midway between the slots 37. The valve casing 27 is provided with two outlet pipe connections 39 and 40 connecting, by ports 41 and 42 respectively, with circular openings 43 and 44, respectively, in the face of the valve seat. The pipe connection 39 is connected with the valve actuating cylinder 45 by means of a pipe 46, as shown in Fig. 1, and the pipe connection 40 is connected with the switch actuating cylinder 47 by means of a pipe 48, as shown in the same figure. The valve casing 27 has drilled through it and through the governor casing 29 into the interior thereof two exhaust holes 49 and 50.

As a result of the construction described, when the disk 30 is in the position indicated in Fig. 4, which corresponds to the position of the parts shown in Figs. 2 and 3, the compressed air supplied to the valve casing 27 through the pipe connection 35 by means of the supply pipe 51 is led through the port 41 and the pipe 46 to the valve controlling cylinder 45 and the switch controlling cylinder is connected through pipe 48 with the exhaust port 49 by means of the left-hand one of the recesses 38 formed in the valve face of the disk 30. When the shaft 2 is brought up to the desired speed for operating the switching mechanism and for throwing the compressor into service, the disk 30 is rotated by means of the governor mechanism described to the position indicated in Fig. 5, for which the pipe 46 is connected with the exhaust port 50 by the right-hand one of the recesses 38 and the pipe 48 receives compressed air through the port 42 by means of which the switching mechanism is actuated.

The valve controlling cylinder 45 contains a piston 52, the lower face of which is subjected to air pressure communicated by the pipe 46 to the port 53 leading through the cap 54 into the lower end of the cylinder 45. The valve controlling cylinder is provided with a lining 55, which may be renewed when desired to make a proper fit with the piston 52, and a piston ring 56 is employed in connection with the piston 52 for preventing leakage of the air around the piston during its operation. A disk 57 of suitable material, such as rubber or leather or composition of similar texture, is disposed in the upper end of the cylinder and held in place by a collar 58 to serve as a seat for the upper end of the piston 52 when the latter is moved to its uppermost position so that the coöperation of these parts serves to positively prevent the passage of the compressed air around the piston 52 into the inside thereof so that the piston might return to its lower position prematurely. The collar 58 is held in place by the spring 59 which extends between said collar and the inner face of the bottom of the piston 52. A hub 60 extends upwardly from the bottom of the piston 52 to center the spring 59 and this hub is counterbored to receive the lower end of the tube 61, which is driven into said counterbore. The tube 61 serves to retain in place a spring 62 between the upper surface of the bottom of the piston 52 and a shoulder 63 formed a short distance above the lower end of the plunger 64, which extends upward and loosely through the tube 61 to engage the lower end of the piston 65 of the suction valve 7 when the piston 52 is raised. The spring 59 serves to return the piston 52 to its lowermost position when the air pressure in the cylinder 45 is released and the spring 62 serves as a cushion to permit the piston 52 to positively move the piston 65 up from its valve seat formed at its lower end, after which the spring 62 serves to support the piston 65 with the lower end of the plunger 64 clear from the piston 52 so that the latter may be positively seated against the valve disk 57 without interference from the suction valve piston 65, such as might occur if it were necessary to so accurately proportion the parts that the piston 65 were required to be lifted clear of its seat and to its uppermost position by means of a plunger rigidly in contact or engagement with its operating piston.

As a result of the construction just described, it will be apparent that when the piston 52 is raised by air pressure beneath it to lift the suction valve piston 65 to its uppermost position, the suction port 66 is in communication with the chamber 9 and thus, through the pipe 10, with substantially atmospheric pressure at all times and, as a result, the corresponding main piston of the compressor may move freely in either direction.

The operating mechanism for the suction valve 8 is identical with that described for the suction valve 7 and the only difference in the connections is that, for the suction valve 7, the port 67 extending horizontally through the head 54 is connected at its left-hand end with the pipe 46 and at its right-hand end with the pipe 68, which latter communicates pressure to the valve cylinder for the suction valve 8, while the horizontal port through the head of this valve cylinder is connected at its left-hand end with the pipe 68 and is plugged in any suitable manner at its right-hand end.

The check valve 12 is preferably of the spring-weighted piston type, the upper portion of its piston being connected to the atmosphere, the lower portion to compression pipe 11, and when in its extreme lower position or non-pressure position, communication between the pipe 11 and the reservoir 13 is disconnected, so that for all pressures in the pipe 11 and tank 13 above a predetermined amount the valve will be raised from its seat and permit free communication of air from the pipe 11 to the tank 13. When, for any reason, the pressure in the pipe 11 and tank 13 drops below this predetermined amount the valve will close and prevent the flow of air from the pipe 11 to the tank 13 until the pressure in the pipe 11 has been increased to the pressure for which the valve 12 is set. The pressure in the pipe 11 is prevented from going back through the compressor into the chamber 9 by the discharge valves, located in the head of the compressor, which act as check valves. This valve 12 which is shown in section in Fig. 12 comprises a casing 109 containing a ground seat 110 for the bottom of the piston 111, which is movable in the cylinder 112. The walls of the cylinder 112 are formed as a continuation of the plug 113 which is screwed into the open top of the casing 109. A ground seat 114 coöperates with the top of the piston 111 to form a tight closure when the pressure in the main 11 becomes great enough to overcome the spring 115. It is to be noted that the top of the piston 111 is open to the atmosphere through the opening 116. This valve 12 is installed near the main reservoir so as to give the necessary pipe line volume between the compressor and this valve for operating the valve relieving piston. The pipe 51 is preferably connected with the pipe 11 between the valve 12 and the compressor, as indicated, so that the requisite amount of pressure may be exerted upon the air supply to the centrifugal control valve immediately after the motor has made a few rotations after having the compressor thrown into service by the valve control above described. When, for any reason, the motor 1 is stopped, the compressor is operatively disconnected from the motor, as above described, and during the stopping operation when the motor has slowed down below its critical speed for the governing mechanism, air is admitted under pressure from the pipe 51 to the cylinders 45, and the suction valves 7 and 8 are elevated from their seats to permit the motor to start freely when it is next desired to start the same. At this time the pressure in the pipe 11 is maintained by the discharge valves of the compressor and if this pressure and the pressure in the tank 13 are above the pressure for which the valve 12 is set, the pipe 51 is in connection with the pressure in the tank 13, which air pressure is available when the motor is next started for controlling the valve governing mechanism. If, for any reason, the air pressure in the tank 13 drops below the pressure for which the valve 12 is set, the valve closes, trapping a certain amount of air in the pipe 11 under the pressure for which the valve is set and this is available for the operation of the valve governing mechanism and, if it is not, the first few strokes of the compressor will increase the pressure in pipe 11 to a point sufficient to positively operate the devices controlled by the governing mechanism. When, by the subsequent operation of the compressor, the pressure in pipe 11 is increased above the value required to operate the valve 12, this valve is opened and the pressure in the tank 13 is built up until it is equal to the pressure in the pipe 11, at which time the valve 12 is fully moved to its open position, where it remains until the pressure to which it is subjected drops below its operating value.

As a result of the construction and operation just described, it will appear that when the tank 13 is of comparatively large capacity, as is many times the case, and when the operation begins with no air under pressure in the tank, the comparatively long-time interval which would otherwise occur before the pressure developed in the tank 13 reached the necessary value to operate the valve governing mechanism is avoided since it is only necessary to develop the necessary pressure in the pipe 11 as the valve governing mechanism is set to be actuated by a somewhat lower pressure than is required to operate the valve 12.

In connection with motors of larger sizes, it is desirable to employ resistances 69, 70 and 71 between the main line wires 72, 73 and 74 and the motor supply wires 75, 76 and 77, respectively, in order that the starting current may not be abnormal. When the motor has reached a certain speed, it is desirable to cut these resistances out of circuit for economical considerations and this is accomplished by providing short circuiting contacts 78 for the resistance 69, short-circuiting contacts 79 for the resistance 70, and short-circuiting contacts 80 for the resistance 71. Three contact strips 81, 82 and 83, supported by and insulated from each other by the bar 84 of insulating material, are mounted upon the upper end of a plunger 85 connected at its lower end with a piston 86 contained in the cylinder 47, the disposition of the parts being such that when the piston 86 is moved upwardly, the contact strip 81 engages the contacts 78, the contact strip 82 engages the contacts 79 and the contact strip 83 engages the contacts 80, thus short-circuiting these several contacts and, therefore, the resistances 69, 70 and 71 without establishing connection in any way between the main line wires 72, 73 and 74 at the short-circuiting apparatus. A spring 87 is disposed between the upper end of the cylinder 47 and the upper surface of the piston 86 for the purpose of moving the piston downward when the air pressure in the cylinder 47 is relieved. From the description just given, it will appear that when the governing mechanism reaches its critical speed, the disk 30 by its rotation, not only relieves the pressure in the cylinders 45 but also communicates air under pressure through the pipe 48 to the cylinder 47, thus moving the contact strips 81, 82 and 83 upward to their short-circuiting position, thus placing the full-line potential upon the motor 1. Similarly, when the motor is stopped for any reason and its speed drops below the critical speed for the governing mechanism, the rotation of the disk 30 relieves the air pressure in the pipe 48 and cylinder 47, thus permitting the contact strips 81, 82 and 83 to be moved downward, by the action of the spring 87, and out of engagement with the corresponding short-circuiting contacts at the same time that air pressure is placed upon the pistons in the cylinders 45 to relieve or unload the compressor cylinders.

As a result of the construction and operation of the valve 12 above described, it will appear that the piston 86 is operated for the first few operative strokes of the compressor, even assuming that the tank 13 has practically no air under pressure in it at the time of starting the motor. This is a very desirable condition since for large capacities of storage tanks a considerable time interval might elapse before building up the pressure in the tanks to a sufficient amount to operate the piston 86. In this way I provide for eliminating the starting resistances before they have become unduly heated, whether there is a supply under pressure at the time of starting the motor or not.

In the modified construction shown in Figs. 9, 10 and 11, the shaft $2^a$ has rigidly secured to it a cylindrical element 88 arranged to rotate within the casing 89. The element 88 is provided with a counterbore 90 in which are mounted two brake levers 91 and 92, pivotally secured to the member 88 at 93 and 94, respectively. Springs 95 and 96 are contained in bores formed therefor in the free ends of brake levers 91 and 92 and rest at their outer ends against suitable seats formed therefor in the inner surface of the counterbore formed in the element 88. The brake levers 91 and 92 carry brake shoes 97 and 98, respectively, which rest upon the outer cylindrical surface of a sleeve 99 rotatably supported in a fixed bearing 100. The outer end of the sleeve 99 has formed thereon or carried thereby a grooved pulley 101 for receiving a flexible cord or wire 102, the end of which is secured to said pulley. The cord or wire 102 is led through the casing 89, around a guide roller 103, and by other similar guide rollers as may be necessary to reach the lower end of the devices employed for controlling the suction valves of the compressor as indicated in Fig. 11. The mechanism for controlling these valves may be identical with that shown and described above with the single exception of the manner of operating the piston $52^a$. In the modified construction, instead of this operating means being compressed air, it is purely a mechanical means consisting in a cam 104 pivotally mounted at 105 in the head $54^a$ of the cylinder $45^a$. The cam is provided with an operating lever 106, to the lower end of which the cord or wire 102 is secured. A second cord or wire, or, if preferred, a rod 107 is employed to connect together the operating mechanisms of the several cylinders $45^a$ that may be used on a compressor, depending upon the number of main cylinders with which the compressor is provided. The parts contained within the counterbore formed in the element 88 are preferably inclosed by an annular plate 108 secured to the member 88 so as to clear the sleeve 99.

As a result of the construction just described, it will appear that as the shaft $2^a$ is rotated, the frictional engagement between the brake shoes 97 and 98, and the sleeve 99, due to the thrust inwardly upon the brake levers 91 and 92, by the springs 95 and 96, will cause a rotary motion of said sleeve sufficiently to move the cord 102 to the left, as shown in Fig. 11, for which condition the corresponding suction valve will be raised from its seat with the same effect as shown and described above for the construction indicated in Figs. 1 to 8 inclusive. When the speed of the shaft $2^a$ has increased to a critical value, for which the weight of the brake levers 91 and 92 and the strength of the springs 95 and 96 are proportioned and adjusted, the centrifugal force of the levers will release the sleeve 99, at which time the springs engaging the pistons $52^a$ will force the pistons downward, thus permitting the suction valves to return to their operating position. It will be apparent that other mechanical devices may be employed, if desired, for communicating motion from the cam 104 to the plunger above it, the principal requirement being that motion of the cam shall move the plunger vertically a sufficient distance to hold the piston of the suction valve from its seat until the cam is moved to its releasing position, at which time the plunger is released and the suction valve is permitted to operate so as to throw the load upon the corresponding compressor cylinder.

In carrying out this construction, it will be understood that the brake shoes 97 and 98 are preferably of material having a comparatively high coefficient of friction without interfering with it having a good bearing surface, such, for example, as wood or leather, and, if desired, the receptacle formed in the counterbore 90 by means of the inclosing plate 108 may be partially filled with oil for the purpose of lubricating the parts, depending, of course, upon the nature of the friction material employed for the brake shoes 97 and 98.

While I have shown my invention in the embodiments herein described, it will be understood that I do not limit myself to these constructions as I may employ many equivalents for carrying out my invention, as will at once appear to those skilled in the art.

What I claim is:

1. In combination a compressor having a valve, said valve being adapted to be held open to relieve the compressor during starting, a delivery main, a tank, a loaded valve between said main and said tank for retaining a predetermined pressure in said main upon initial operation of said compressor, and means operated by the fluid pressure retained by said last valve for opening said first valve to relieve said compressor during starting.

2. In combination a motor, a compressor having a valve, said valve being adapted to be held open to relieve the compressor during starting of the motor, a delivery main, a tank, a loaded valve between said main and said tank for retaining a predetermined pressure in said main upon initial operation of said compressor, means controlled by the pressure retained by said last named valve for holding said first valve open, and centrifugal means for controlling said last means to restore said first valve to its seat.

3. In combination a fluid compressor, a suction valve for said compressor, a cylinder for holding said valve open to relieve said compressor, a delivery main, a tank, a loaded valve between said main and said tank for retaining a predetermined pressure in said main upon initial operation of said compressor, and connecting means between said main and said cylinder for disabling said suction valve by means of the pressure retained by said loaded valve.

4. In combination a fluid compressor, an electric motor for driving said compressor, a valve for said compressor, said valve being adapted to be held open to relieve the compressor during starting of said motor, a fluid pressure element for operating said valve to relieve the compressor, a delivery main, a tank, a loaded valve between said main and said tank for retaining in said main a predetermined pressure upon initial operation of said compressor and a connection between said pressure controlled element and said main.

5. In combination a compressor, an induction motor for operating said compressor, a suction valve for said compressor, a fluid pressure element for holding said suction valve open to relieve the compressor during starting of said motor, a delivery main, a tank, a loaded valve between said main and said tank for retaining in said main predetermined pressure upon initial operation of said compressor, a connection between said main and said cylinder and a centrifugal governor controlling said connection.

6. In combination, a fluid compressor, an induction motor for driving said compressor, a suction valve for said compressor, a piston for holding said valve off of its seat during starting of said motor, a delivery main, a tank, a loaded valve between said main and said tank, a connection between said piston and said main, a valve in said connection, and a centrifugal governor connected to said motor, said governor closing said valve upon a predetermined speed of said motor.

7. In combination a compressor having a suction valve, a piston and cylinder for disabling said suction valve, a delivery main, a tank, a loaded valve between said delivery main and said tank, a connection between said main and said cylinder, and a valve in said connection.

8. In combination, an air compressor having a plurality of cylinders, a suction valve for each cylinder, a valve controlling cylinder for each suction valve, connections between each valve controlling cylinder and the corresponding suction valve for temporarily disabling said suction valve, an electric motor, mechanism for operating the compressor from the motor, centrifugal devices actuated by the motor, valve mechanism actuated by the centrifugal devices, compressed air connections between the valve mechanism and the valve controlling cylinders for operating the disabling connections when the speed of the motor is below a predetermined amount, a starting resistance in circuit with the motor, a short-circuiting switch, a pneumatic cylinder for actuating said switch, and a pipe connection from said pneumatic cylinder to the valve actuated by the centrifugal devices for short circuiting said resistance by means of said switch when the speed of the motor reaches a predetermined value.

9. In combination, an electric motor, a compressor, mechanism for driving the compressor from the motor, centrifugal governing mechanism actuated by the motor, valve mechanism operated by the governing mechanism at a predetermined speed of the motor for unloading the compressor, a starting resistance in circuit with the motor, and devices for short-circuiting said starting resistance by the operation of the governing mechanism at a predetermined speed of the motor.

10. In combination, an electric motor, a compressor, an inwardly opening suction valve for said compressor, mechanism between the motor and the compressor for actuating the compressor, centrifugal governing mechanism operated by the motor, devices actuated by the governing mechanism to hold the suction valve away from its seat until the motor reaches a desired speed, a starting resistance in circuit with the motor, and devices for short-circuiting said starting resistance by the operation of the governing mechanism at a desired speed of the motor.

11. In combination, an electric motor, a compressor, an inwardly opening suction valve for said compressor, mechanism between the motor and the compressor for actuating the compressor, governing mechanism operated by the motor, devices actuated by the governing mechanism for preventing the closure of the suction valve until the motor reaches a predetermined speed, said connecting devices serving to permit the suction valve to operate when the speed of the motor reaches a predetermined value, a starting resistance in circuit with the motor, and devices for short-circuiting said starting resistance by the operation of the governing mechanism at a predetermined speed of the motor.

12. In combination, a motor, a compressor, mechanism for driving the compressor from the motor, a supply valve for the compressor, a delivery pipe for the compressor, a receiving tank connected with the delivery pipe, a pressure limiting valve in the delivery pipe, centrifugal governing mechanism operated by the motor, and devices controlled by the governing mechanism for disabling said supply valve below a predetermined speed.

13. In combination, an electric induction motor, a compressor, mechanism for driving the compressor by the motor, speed controlled governing mechanism operated by the motor for unloading the compressor during the starting of the motor, a starting resistance in the circuit of the motor, and switching mechanism operated by the governing mechanism for short-circuiting said resistance when the motor reaches a predetermined speed.

14. In combination, an electric induction motor, a compressor, mechanism between the motor and compressor for driving said compressor, speed controlled governing mechanism operated by the motor, a starting resistance in the motor circuit, and fluid actuated switching mechanism controlled by the governing mechanism for short-circuiting said resistance, said governing mechanism including a valve for controlling the operation of said switching mechanism at a predetermined speed, said fluid actuated switching mechanism being supplied with fluid under pressure from said compressor.

15. In combination, a motor, a compressor, driving mechanism between the motor and compressor, a suction valve, a plunger for moving said valve away from its seat, a piston for operating said plunger, and mechanism for actuating said piston during the starting of the motor and for releasing said piston and suction valve when the motor reaches a predetermined speed.

16. In an apparatus of the class described, the combination of a cylinder, a piston in said cylinder, a sleeve secured to said piston and forming a guide therefor, a spring for returning said piston, said spring surrounding said sleeve, a plunger in said sleeve and a spring between said plunger and said piston.

17. In combination, a motor, a compressor, a suction valve for said compressor, and mechanism for holding the suction valve from its seat comprising a cylinder, a piston in the cylinder, a plunger between the piston and the suction valve, a seat for said piston limiting the movement thereof, a sleeve attached to said piston, said sleeve surrounding said plunger, a compression spring in said sleeve connecting the plunger and the piston, and a returning spring for the piston.

18. In combination, a motor, a compressor, a suction valve for said compressor, and mechanism for holding the suction valve from its seat comprising a cylinder, a piston in the cylinder, a plunger between the piston and the suction valve, a sleeve attached to said piston, said sleeve surrounding said plunger, a compression spring in said sleeve between the plunger and the piston, a returning spring for the piston, and a valve seat formed on the end of the piston for holding the pressure in the cylinder when the piston is actuated and for limiting the movement of said piston.

19. In combination, a motor, a compressor, a suction valve for said compressor, mechanism for holding the suction valve from its seat comprising a cylinder, a piston in the cylinder, a plunger between the piston and the suction valve, a spring connection between the plunger and the piston, and a returning spring for the piston, and valve mechanism operated by the motor for supplying compressed air to the cylinder during the starting of the motor.

20. In combination, a motor, a compressor, a suction valve for said compressor, mechanism for holding the suction valve from its seat comprising a cylinder, a piston in the cylinder, a plunger between the piston and the suction valve, a spring connection between the plunger and the piston, a returning spring for the piston, a valve seat formed on the end of the piston for holding the pressure in the cylinder when the piston is actuated, and valve mechanism operated by the motor for supplying compressed air to the cylinder during the starting of the motor.

21. In combination, a motor, a compressor, a suction valve for said compressor, mechanism for holding the suction valve from its seat comprising a cylinder, a piston in the cylinder, a plunger between the piston and the suction valve, a spring connection between the plunger and the piston, and a returning spring for the piston, governing mechanism actuated by the motor, valve mechanism actuated by the governing mechanism, and compressed air connections between the governing mechanism and the cylinder for supplying compressed air to the cylinder during the starting of the motor.

22. In combination, a motor, a compressor, a suction valve for said compressor, mechanism for holding the suction valve from its seat comprising a cylinder, a piston in the cylinder, a plunger between the piston and the suction valve, a spring connection between the plunger and the piston, a returning spring for the piston, and a valve seat formed on the end of the piston for holding the pressure in the cylinder when the piston is actuated, governing mechanism actuated by the motor, valve mechanism actuated by the governing mechanism, and compressed air connections between the governing mechanism and the cylinder for supplying compressed air to the cylinder during the starting of the motor.

23. In combination, a motor, a compressor, a suction valve for said compressor, mechanism for holding the suction valve from its seat comprising a cylinder, a piston in the cylinder, a plunger between the piston and the suction valve, a spring connection between the plunger and the piston, and a returning spring for the piston, governing mechanism actuated by the motor, valve mechanism actuated by the governing mechanism, and compressed air connections between the governing mechanism and the cylinder for supplying compressed air to the cylinder during the starting of the motor and for releasing the pressure in the cylinder when the motor reaches a desired speed.

24. In combination, a motor, a compressor, a suction valve for said compressor, mechanism for holding the suction valve from its seat comprising a cylinder, a piston in the cylinder, a plunger between the piston and the suction valve, a spring connection between the plunger and the piston, a returning spring for the piston, and a valve seat formed on the end of the piston for holding the pressure in the cylinder when the piston is actuated, governing mechanism actuated by the motor, valve mechanism actuated by the governing mechanism, and compressed air connections between the governing mechanism and the cylinder for supplying compressed air to the cylinder during the starting of the motor and for releasing the pressure in the cylinder when the motor reaches a desired speed.

25. In combination, a motor, a compressor, a plurality of suction valves for said compressor, mechanism for holding each of the suction valves from its seat comprising a cylinder, a piston in the cylinder, a plunger between the piston and the suction valve, a spring connection between the plunger and the piston, and a returning spring for the piston, governing mechanism actuated by the motor, valve mechanism actuated by the governing mechanism, and compressed air connections between the governing mechanism and the cylinders for supplying compressed air to the cylinders during the starting of the motor.

26. In combination, a motor, a compressor, a plurality of suction valves for said compressor, mechanism for holding each of the suction valves from its seat comprising a cylinder, a piston in the cylinder, a plunger between the piston and said suction valve, a spring connection between the plunger and the piston, a returning spring for the piston, and a valve seat formed on the end of the piston for holding the pressure in the cylinder when the piston is actuated, governing mechanism actuated by the motor, valve mechanism actuated by the governing mechanism, and compressed air connections between the governing mechanism and the cylinders for supplying compressed air to the cylinders during the starting of the motor.

27. In combination, a motor, a compressor, a plurality of suction valves for said compressor, mechanism for holding each of the suction valves from its seat comprising a cylinder, a piston in the cylinder, a plunger between the piston and said suction valve, a spring connection between the plunger and the piston, and a returning spring for the piston, governing mechanism actuated by the motor, valve mechanism actuated by the governing mechanism, and compressed air connections between the governing mechanism and the cylinders for supplying compressed air to the cylinders during the starting of the motor and for releasing the pressure in the cylinders when the motor reaches a desired speed.

28. In combination, a motor, a compressor, a plurality of suction valves for said compressor, mechanism for holding each of said suction valves from its seat comprising a cylinder, a piston in the cylinder, a plunger between the piston and the suction valve, a spring connection between the plunger and the piston, a returning spring for the piston, and a valve seat formed on the end of the piston for holding the pressure in the cylinder when the piston is actuated, governing mechanism actuated by the motor, valve mechanism actuated by the governing mechanism, and compressed air connections between the governing mechanism and the cylinders for supplying compressed air to the cylinders during the starting of the motor and for releasing the pressure in the cylinders when the motor reaches a desired speed.

29. In combination, a motor, a compressor having an unloading valve, mechanism for driving the compressor from the motor, and valve mechanism for temporarily disabling the compressor by operating said unloading valve, a governor controlling said valve mechanism, said valve mechanism comprising a shaft, a disk on the end of the shaft having opposite slots formed therethrough and opposite intermediate recesses formed in its valve face, and a casing forming a valve seat for the disk and having ports through it controlled by said disk.

30. In combination, a motor, a compressor having an unloading valve, mechanism for driving the compressor from the motor, and valve mechanism for temporarily disabling the compressor by operating said unloading valve, a centrifugal governor operating at a predetermined speed to control said valve mechanism, said valve mechanism comprising a shaft, a disk on the end of the shaft having opposite slots formed therethrough and opposite intermediate recesses formed in its valve face, and a casing forming a valve seat for the disk and having ports through it controlled by said disk, said shaft having a hole drilled through it for oiling the shaft and said disk.

31. In combination, a motor, a compressor having an unloading valve, mechanism for driving the compressor from the motor, and valve mechanism for temporarily disabling the compressor by operating said unloading valve, said mechanism comprising a shaft, a disk on the end of the shaft having opposite slots formed therethrough and opposite intermediate recesses formed in its valve face, a casing forming a valve seat for the disk and having ports through it controlled by said disk, said shaft having at its operating end similar flattened sides, an operating crank disposed upon said operating end of the shaft in engagement with said flattened sides and a centrifugal governor for actuating said crank only upon the attainment of a predetermined speed of said motor.

32. As a means for actuating a valve, the combination of a plunger for engaging the valve, a piston for operating the plunger, a cylinder containing the piston, and a spring connection between the piston and the plunger, the end of the piston forming a valve to maintain the pressure in the cylinder when the piston is actuated.

33. As a means for actuating a valve, the combination of a plunger for engaging the valve, a piston for operating the plunger, a cylinder containing the piston, a spring connection between the piston and the plunger, the end of the piston forming a valve to maintain the pressure in the cylinder when the piston is actuated, and a valve disk in the end of the cylinder for engagement with the end of the piston when the latter is actuated.

34. As a means for actuating a valve, the combination of a plunger for engaging the valve, a piston for operating the plunger, a cylinder containing the piston, a spring connection between the piston and the plunger, the end of the piston forming a valve to maintain the pressure in the cylinder when the piston is actuated, a valve disk in the end of the cylinder for engagement with the end of the piston when the latter is actuated, and a spring in the cylinder tending to return the piston to its releasing position.

35. In combination, an electric motor, a compressor, mechanism between the motor and compressor for driving said compressor, a centrifugal governor operated by the motor, a starting resistance connected with the motor circuit, switching mechanism for eliminating the resistance from the motor circuit when the compressor reaches a predetermined speed, a valve controlled by said governor and a plunger controlled by said valve for operating said switching mechanism, said plunger being supplied with fluid under pressure from said compressor.

36. In combination, an air compressor, a driving motor therefor, a starting resistance for the motor, a pressure-operated cylinder and associated mechanism for short-circuiting said resistance, a delivery pipe for said compressor, a pressure-limiting valve in said pipe, a suction-valve for said compressor, a pressure-operated element for disabling said valve, an operating supply pipe connected to said delivery pipe, a valve in one position connecting said supply pipe with the element for disabling the suction-valve, a centrifugal device for operating said valve to disconnect the supply pipe from the suction-valve disabling-element and to connect it to the pressure-operated cylinder for short-circuiting the resistance.

37. In combination, a compressor comprising a suction valve, a motor for driving said compressor, an unloader arranged to temporarily retain said suction valve in open position, and mechanism driven by the motor adapted to hold said unloader in operative position when the motor is inert and during the time the same is being started.

38. In combination, a compressor comprising valves, a motor for driving said compressor, an unloader arranged to temporarily affect the compressor valves to render the compressor inoperative, and mechanism driven by the motor adapted to hold said unloader in position to so affect the valves when the motor is inert and during the time said motor is being started.

39. In combination, a compressor comprising valves, a motor for driving said compressor, an unloader arranged to temporarily affect said valves to render the compressor inoperative, and mechanism driven by the motor adapted to hold said unloader in position to so affect the valves during the time said motor is being started.

40. In combination, a motor, a compressor driven by the motor, a centrifugal device driven by the motor, a starting resistance in the motor circuit, devices normally rendering the compressor inoperative, said last-mentioned devices connected with the centrifugal device and adapted to render the compressor operative when the motor attains a certain speed, together with switching mechanism arranged to eliminate the resistance from the motor circuit before the compressor is rendered operative.

41. In combination, a motor, a compressor driven by the motor, a controlling device driven by the motor, a starting resistance in the motor circuit, devices normally rendering the compressor inoperative, said last-mentioned devices connected with the controlling device and adapted to render the compressor operative when the motor attains a certain speed, together with switching mechanism arranged to eliminate the resistance from the motor circuit before the compressor is rendered operative.

In witness whereof, I hereunto subscribe my name this 3rd day of December, A. D. 1913.

BURTON S. AIKMAN.

Witnesses:
 THOS. T. BOURS,
 R. H. WEILAND.